UNITED STATES PATENT OFFICE.

GEORGE W. DISMAN, OF UPPER SANDUSKY, OHIO.

IMPROVED COMPOSITION FOR JOURNAL-BOXES.

Specification forming part of Letters Patent No. 52,829, dated February 27, 1866.

*To all whom it may concern:*

Be it known that I, GEORGE W. DISMAN, of Upper Sandusky, in the county of Wyandot and State of Ohio, have invented or discovered a new and useful Composition for Journal Boxes or Bearings; and I do hereby declare that the following is a full, clear, and exact description of the same.

My invention consists in a composition for journal boxes or bearings, made of copper and glass fused and prepared with borax and prussiate of potash, and for lighter boxes or journal-bearings having in the composition some lead to soften it.

To enable others skilled in the art to make and use my invention, I will proceed to describe the same and the process of carrying out.

For light journal-bearings I use of the ingredients named about the following proportions: one pound of copper, four ounces of glass, one ounce of borax, half an ounce of prussiate of potash, eight ounces of lead.

When the journal or its bearing is to sustain a very heavy weight, or is subjected to sudden strains or jars, then I omit the lead, or so much of it as will leave the composition hard enough to sustain such weights or jars; and in reducing the quantity of lead I increase the quantity of borax and prussiate of potash and glass to make the composition harder.

To prepare the composition I proceed as follows: I take a crucible of any known kind and put in it the copper and glass, and place the crucible in an ordinary blacksmith's fire, or any other suitable fire, and heat up the contents. When the copper and glass are at a red heat I introduce the borax, and when in a fusible or fused state I introduce the prussiate of potash, and when the contents of the crucible are all melted I skim off the dross or slag and pour or put in the lead, and immediately on putting in the lead I pour the composition into the boxes or bearings, or into mass to be used afterward. If not poured and allowed to cool immediately after putting in the lead, it (the lead) will, by oxidation or vaporization, be lost. In remelting the composition after it has been made and cooled, I find that it becomes more thoroughly mixed than in the first process.

As above stated, while for ordinary purposes or light journals, and as a matter of economy, I use and prefer to use lead, yet I may, can, and do dispense with it or use it in smaller quantities than that above mentioned; but the leading characteristic of my invention consists in hardening copper for journal boxes or bearings by mixing with it, in a fused state, glass, and expediting or attaining more pefect fusion and union by the use of borax and prussiate of potash in the composition.

Having thus fully described my invention, what I claim therein as new, and desire to secure by Letters Patent, is—

A composition for journal boxes or bearings, composed of copper and glass and mixed or fused with borax and prussiate of potash, and with or without lead, as herein described, and for the purpose specified.

GEORGE W. DISMAN.

Witnesses:
   GEORGE MYERS,
   T. W. SULLIGER.